May 6, 1952     J. R. BAUMGARTNER     2,595,325
PAPER WEB GUIDE MECHANISM
Filed Dec. 18, 1950
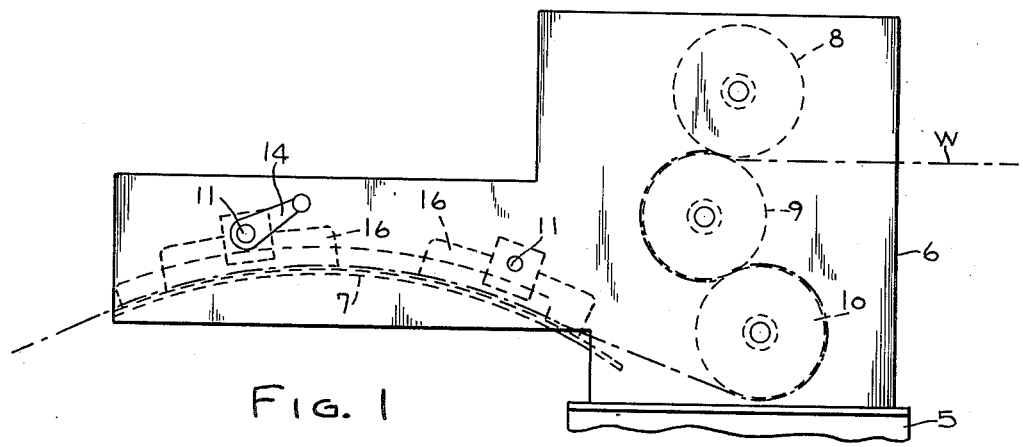
FIG. 1
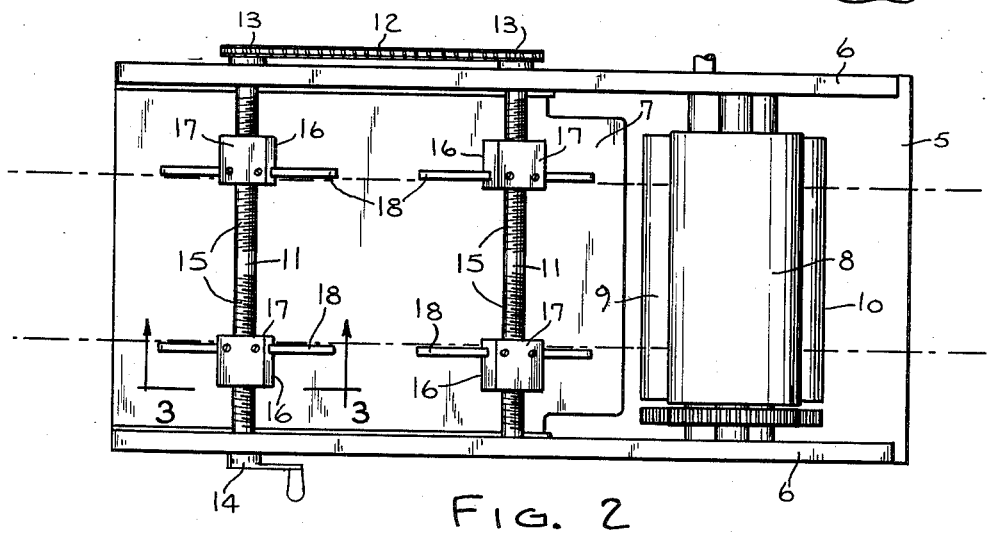
FIG. 2
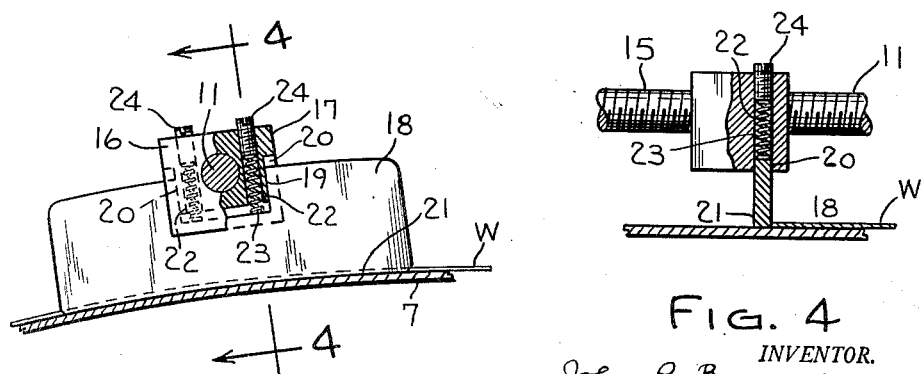
FIG. 3
FIG. 4
INVENTOR.
John R. Baumgartner
BY
Charles R. French
ATTORNEYS

UNITED STATES PATENT OFFICE 2,595,325

PAPER WEB GUIDE MECHANISM

John R. Baumgartner, Milwaukee, Wis.

Application December 18, 1950, Serial No. 201,357

2 Claims. (Cl. 271—2.6)

The invention relates to paper handling machinery where paper is conducted in the form of a web to mechanism for printing or fabricating the web.

The object of the invention is to provide adjustable guide means for the web to accommodate webs of different width in which a pair of guides are simultaneously adjusted relative to the bed or support over which the web is fed and in which each of the guides is formed of a nut member and a guide member slidably mounted on the nut member and yieldingly urged into contact with the bed or support so as to positively confine the web to that portion of the bed between the adjustable guides and prevent the web working its way under the guides.

The invention further consists in the several features hereinafter described and more particularly defined by claims at the conclusion hereof.

In the drawings:

Fig. 1 is a side elevation view of a portion of a paper handling machine equipped with the guide mechanism embodying the invention;

Fig. 2 is a plan view of the structure shown in Fig. 1;

Fig. 3 is a detailed vertical sectional view taken on the line 3—3 of Fig. 2;

Fig. 4 is a detailed vertical sectional view taken on the line 4—4 of Fig. 3.

Referring to the drawings, the numeral 5 designates generally the frame of a unit of a paper handling machine having side frame members 6 between which a bed plate or support 7 is mounted, said uprights also having a series of feed rolls 8, 9, and 10 mounted and driven in any suitable manner so as to feed the web of paper W from a supply roll over the bed 7, the web being shown as advancing between the nips of the rolls 8 and 9 and 9 and 10, respectively.

For accurately guiding the web W over the support 7 I have shown two sets of guide mechanism, each including a feed screw 11 journalled in the frame members 6 and operatively connected together by a chain 12 running over sprockets 13 on the extended ends of said screws, one of said shafts provided with a hand crank 14 so that turning of this crank simultaneously turns both of said screws 11.

Each feed screw 11 is provided with threaded portions 15 of opposite hand or direction and adjustable guides 16 are associated with each of these threaded portions so that they may be moved toward or away from each other in equal increments of movement laterally of the bed when the screws 11 are rotated, so that the distance between the guides may be varied to accommodate different widths of webs W.

Each guide member 16 comprises a nut 17 mounted on the threaded portion 15 and a guide member 18 mounted for movement with said nut. As shown in Figs. 3 and 4, the guide member 18 is formed as a flat sided plate having a centrally disposed notch 19 extending inwardly from its top, and the nut has recess 20 in its sides and bottom in which the sides and bottom of the notch 19 are slidably mounted and guided. The face 21 of the plate member 18 is formed to closely conform to the contour of the top surface of the bed or support 7 and is here shown as curved to conform to the curvature of said support 7. The guide member 18 is normally urged downwardly under considerable pressure to bring its face 21 into contact with the bed by spaced springs 22 interposed between the nut 17 and guide member. Each spring is mounted in a bore 23 in the nut and engages at one end with the bottom side of the notch 19 and at its other end is engaged by a set screw 24 mounted in the upper threaded end of the bore 23 and which may be turned relative to the nut 17 to adjust the tension of the spring 22.

With the above arrangement, the adjustable guide members 16 cooperate with the support 7 to form the sides of a trough through which webs of varying thicknesses of paper are accurately guided as the web moves over said support and the web is positively prevented from working in under the guides as frequently happens where the nut and guide member are formed as a unit.

I desire it to be understood that this invention is not to be limited to any particular form or arrangement of parts except in so far as such limitations are included in the claims.

What I claim as my invention is:

1. In paper handling machinery having a support over which a web of paper is fed, adjustable web guide mechanism comprising a feed screw having spaced oppositely disposed threads and mounted for rotary adjustment above said support, web guides mounted on the threaded portions of said screw, each guide comprising a nut in threaded engagement with said screw and provided with a guide portion, a guide member slidably guided by the guide portion of said nut, and spring means interposed between said guide member and nut for yieldingly urging said guide member into contact with said support, the contacting face of said guide member conforming to the surface contour of said support.

2. In paper handling machinery having a support over which a web of paper is fed, adjustable web guide mechanism comprising a feed screw having spaced oppositely disposed threads and mounted for rotary adjustment above said support, web guides mounted on the threaded portions of said screw, each guide comprising a nut in threaded engagement with said screw and provided with a guide slot, a guide member having a centrally disposed notch slidably mounted in said guide slot and having a lower face of a contour corresponding to that of said support, and spaced springs adjustably mounted in said nut and engageable with the bottom side of said notch for holding said face of said guide member in contact with said support.

JOHN R. BAUMGARTNER.

REFERENCES CITED

The following references are of record in the file of this patent:

UNITED STATES PATENTS

| Number | Name | Date |
|---|---|---|
| 1,152,856 | Smith | Sept. 7, 1915 |
| 1,557,510 | West | Oct. 13, 1925 |
| 1,566,441 | Smothers | Dec. 22, 1925 |
| 1,700,099 | Shively | Jan. 22, 1929 |